(12) United States Patent
Li

(10) Patent No.: US 10,037,487 B2
(45) Date of Patent: Jul. 31, 2018

(54) SINGLE-CHIP FINANCIAL AUDIO IC CARD

(71) Applicant: GUANGZHOU RONGSHENG INFORMATION TECHNOLOGY CO., LTD., Guangzhou, Guangdong (CN)

(72) Inventor: Xiaoming Li, Guangdong (CN)

(73) Assignee: GUANGZHOU RONGSHENG INFORMATION TECHNOLOGY CO., LTD., Guangzhou (CN)

( * ) Notice: Subject to any disclaimer, the term of this patent is extended or adjusted under 35 U.S.C. 154(b) by 33 days.

(21) Appl. No.: 15/627,476

(22) Filed: Jun. 20, 2017

(65) Prior Publication Data

US 2018/0060716 A1 Mar. 1, 2018

(30) Foreign Application Priority Data

Aug. 31, 2016 (CN) .......................... 2016 2 1007814

(51) Int. Cl.
*G06K 19/06* (2006.01)
*G06K 19/077* (2006.01)

(52) U.S. Cl.
CPC .. *G06K 19/07711* (2013.01); *G06K 19/07733* (2013.01); *G06K 19/07766* (2013.01)

(58) Field of Classification Search
CPC ........... G06K 19/0723; G06K 19/0728; G06K 19/077; G06K 19/07711; G06K 19/07733; G06K 19/07749; G06K 19/0775; G06K 19/07766; G06K 19/07769
See application file for complete search history.

(56) References Cited

U.S. PATENT DOCUMENTS

| | | | | |
|---|---|---|---|---|
| 8,730,009 B2* | 5/2014 | Barry | .................... | G06F 21/32 340/384.73 |
| 9,665,866 B2* | 5/2017 | Liu | ...................... | G06Q 20/34 |
| 2002/0060249 A1* | 5/2002 | Perron | ................ | G06K 19/077 235/492 |
| 2005/0236490 A1* | 10/2005 | Fortune | .................... | G06K 7/00 235/492 |

FOREIGN PATENT DOCUMENTS

WO       WO 0199039 A1 * 12/2001       ........... G06K 7/0008

* cited by examiner

*Primary Examiner* — Thien M Le
*Assistant Examiner* — April Taylor

(57) ABSTRACT

The application discloses a single-chip financial audio IC card, including a security chip, a contact module, a non-contact module and an audio module switch. The security chip is used for controlling, analyzing and processing data, which is shared by a controlling, analyzing and processing data module; the contact module has function of contact communication, including a 7816 interface; the non-contact module has function of non-contact communication, including a RF coil; the audio module has function of acoustic communication, including a switch, a battery and a buzzer; the contact module, non-contact module and audio module are connected in parallel to the security chip. The application of single-chip financial audio IC card has the advantages of low cost, small processing difficulty, good compatibility, high security, good stability and reliability.

10 Claims, 3 Drawing Sheets

SINGLE-CHIP FINANCIAL AUDIO IC CARD

CROSS REFERENCE TO RELATED APPLICATIONS

The present application claims the benefit of Chinese Utility Model Application No. 201621007814.9 filed on Aug. 31, 2016. All the above are hereby incorporated by reference.

FIELD

The application relates to the field of IC card technology, and more particularly to a single-chip financial audio IC card.

BACKGROUND

As an important means of integrating with the world, financial standardization is an important technical basis for national economic and social development. With reference to the EMV2000 standards, the People's Bank of China promulgated "China Financial Integrated Circuit (IC) card specification (2005)" in the year of 2005 (referred to as PBOC2.0 specification). The People's Bank of China revised the PBOC2.0 specification and promulgated the "China Financial Integrated Circuit (IC) card specification (2010)" in the year of 2010, which added non-contact communication regulations and micropayment specifications, modified and improved the debit and credit function in the application, added the self-designed micro-payment business based on debit and credit, integrated compatibility, practicality and operability, had a good forward looking and promoted the application of financial IC card comprehensively.

Financial IC card mainly includes contact card, non-contact card and contact/non-contact double-sides card. With the requirement for emerging payment methods, the financial audio IC card appears in the market gradually. The financial audio IC card has audio communication module circuit embedded into itself, contact module, non-contact module and audio module, so that the financial IC card not only has the traditional contact communication mode and non-contact communication mode, but also has audio communication mode.

In the existing technology, the financial audio IC card usually adopts double-chip scheme in the financial audio IC card, which has two security chips, wherein one security chip is shared by the contact module and the non-contact module, and the other is used by the audio module individually, so that the audio module is physically isolated from the contact module and non-contact module, thus they will work independently and had no interference with each other. Although the double-chip scheme is simple in principle, easy to implement and has no problems of operating mode selection and interference, there are still the following shortcomings: high cost in use of 2 security chips at the same time; incompatibility with the existing chip burning process, which means the existing burning equipment and process should be altered for writing relevant data and program into the audio chip, thus causing high cost; since it needs to set two independent circuits on the IC card, increasing the complex routing of the circuit lay out and processing difficulty; data is stored in two security chips which are physically isolated from each other and do not impact relatively, thus increasing the probability of failure during use, leading to poor stability and reliability, and causing trouble to the consistency of the data in the two security chips.

Therefore, it is necessary to provide a new single-chip financial IC card to solve the above problems.

SUMMARY

The present application is to provide a single-chip financial audio IC card with low cost, small processing difficulty, good compatibility, high security, good stability and reliability.

The application provides a single-chip financial audio IC card, comprising:
a security chip used for controlling, analyzing and processing data,
a contact module having a function of contact communication,
a non-contact module having a function of non-contact communication, and
an audio module having a function of acoustic communication;
wherein the contact module comprises a 7816 interface;
the non-contact module comprises a radio frequency (RF) coil;
the audio module comprises a switch, a buzzer and a battery; and
the contact module, the non-contact module and the audio module are connected in parallel to the security chip.

Preferably, the security chip comprises a contact interface, a non-contact interface and an audio interface;
the contact interface comprises VCC, GND, CLK, RST and IO pins;
the non-contact interface comprises LA pin and LB pins, the LA pin and the LB pin being respectively connected to both ends of the RF coil;
the VCC and GND pins are shared by the audio interface; and the audio interface further comprises two or more GPIO pins.

Preferably, the audio module comprises battery, switch and buzzer, wherein, one pole of the battery in the audio module is directly connected to the security chip, the other pole is directly connected to the switch; the switch has three pins identified as the first pin, the second pin and the third pin; wherein the first pin is connected to the negative pole of the battery; the second pin is connected to the GND of security chip; the third pin is connected to one of the GPIO pins in the security chip, and said GPIO pin is set as GPIO1; every pin of the switch is disconnected with each other before the switch is turned on and they would be connected with each other after the switch is turned on; the A pin of the buzzer is connected to other GPIO pins except the GPIO1 pin of security chip, and said GPIO pin is set as GPIO2; the B pin of the buzzer is connected to VCC, GND and other GPIO pins except the GPIO2 pin.

Preferably, the audio module comprises battery, switch and buzzer, one pole of the battery in the audio module is directly connected to the security chip, and an other pole of the battery is directly connected to the switch; the switch comprises a first pin, a second pin and a third pin; the first pin is connected to the one pole or the other pole of the battery; the second pin is connected to the GND pin of the security chip; the third pin is connected to one of the GPIO pins in the security chip set as GPIO1; and the buzzer comprises a A pin and a B pin, and the A pin and the B pin of the buzzer are connected to two of the two or more GPIO pins of the security chip respectively, one of which is the GPIO1 pin, the other of which is a GPIO2 pin.

Preferably, the switch is in series with the battery and the security chip for controlling the power supply of the battery to the security chip; and the switch is connected to the GPIO1 of the security chip, so as to provide the audio module with an actuating signal and the security chip with a power supply channel.

Preferably, among the two pins of the buzzer, the A pin of the buzzer is directly connectable to the VCC pin, the GND pin, the GPIO1 pin or the other GPIO pins except the GPIO1 pin; and the B pin of the buzzer is directly connectable to any one or more GPIO pins except the GPIO1 pin of the security chip.

Preferably, the security chip has at least two GPIO pins, wherein, the security chip comprises at least two additional GPIO pins which are configurable as input interfaces or output interfaces according to practical demands, and at least one of the at least two additional GPIO pins is set as an input pin to receive actuating signal for audio module; the security chip could identify the contact functional mode or the audio working mode according to status of GPIO1 pin; moreover, the input pin could provide the security chip with power supply channel for the battery of audio module, and another of the at least two additional GPIO pins is set as an output pin.

Preferably, the contact module comprises 7816 interface, which is directly connected to VCC, GND, CLK, RST and JO pins of the security chip according to the related specifications of China Financial Integrated Circuit (IC) card and specification of ISO 14443.

Preferably, the non-contact module comprises RF antenna, which is directly connected to LA pin and LB pin of the security chip according to the related specifications of China Financial Integrated Circuit (IC) card and specification of ISO 14443.

Preferably, the GPIO pin of security chip comprises at least one output pin and one input pin Preferably, the VCC and GND pins of security chip are shared by the contact module and audio module, wherein the power is supplied to the security chip through VCC and GND in operation; the difference lies in that the 7816 interface of the contact module is directly connected to the VCC and GND pin, when in operation, the positive and negative poles of external power are directly connected to the security chip through the 7816 interface; the positive pole or the negative pole of audio module is respectively and correspondingly connected to the VCC pin or the GND pin of security chip directly; accordingly, a switch is correspondingly connected in series with the negative pole or the negative pole of the battery, and with the GND pin or the VCC pin of security chip so that only when the switch is closed, an integrated circuit is formed, the power is supplied to the security chip through the VCC pin and GND pin. When IC card is at the status of contact functional mode or non-contact working mode, the switch is turned off, the power supply channel between the battery of audio module and the security chip is cut off, therefore, no power would be supplied to the security chip; When IC card is at the status of audio working mode, the switch is turned on, the power supply channel between the battery of audio module and the security chip is connected, GPIO1 pin provides an audio mode signal to the security chip, IC card now is working at audio mode using the battery of audio module.

Preferably, the GPIO1 pin could provide a power supply channel for the security chip. When the GPIO1 pin is used to provide the power supply channel, the second pin of the switch could disconnect to the GND pin or the VCC pin. When this technical scheme is adopted, the GPIO1 pin provides security chip with the strobe signal for audio working mode and the security chip with power supply channel after the switch is turned on; when the security chip is working at the audio working mode, GPIO1 pin would lose its function of providing the strobe signal for audio working mode, and just supply power to security chip as a power supply channel at this moment. When the GPIO1 pin is used to provide a power channel for the security chip, one pin of the switch could be set as floating, that is only 2 pins of the switch are in use, thus decreasing the complexity of switch; besides, the switchover between the three working modes of audio card would be more clear, thus avoiding wrong operation and making the operation more convenient and reliable.

Compared with related technology, the single-chip financial audio IC card of the application reduces the cost and processing difficulty by connecting the contact module, the non-contact module and the audio module in parallel to the security chip and sharing the same security chip. It is compatible to the existing chip burning process, so there is no need to change the existing burning equipment and process, thus causing no cost in equipment transformation, which also increases the security, stability and reliability.

DETAILED DESCRIPTION OF PREFERRED EMBODIMENTS

The application will be described in further detail with reference to the attached diagrams and embodiments.

Embodiment 1

Figure 1:
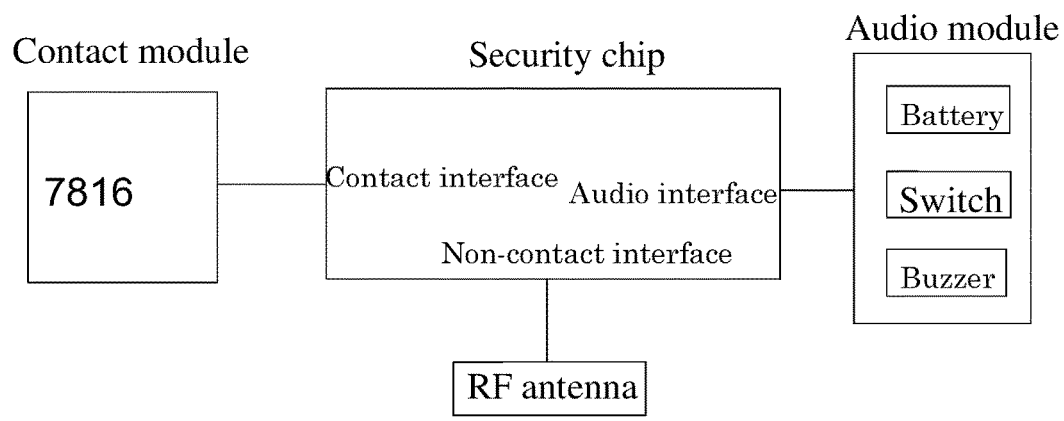
FIG. 1 is a block diagram showing the structure principle of embodiment 1 of the single-chip financial audio IC card of the present application.
Figure 2:
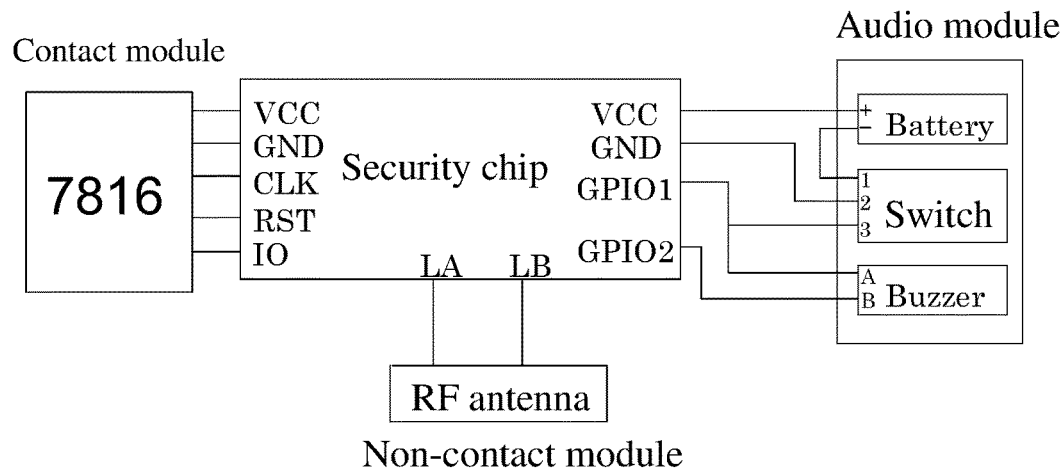
FIG. 2 is a circuit schematic diagram of embodiment 1 of the single-chip financial audio IC card of the application.

Referring to FIG. 1 and FIG. 2, FIG. 1 is a structure diagram of the single-chip financial audio IC card of the application; FIG. 2 is a circuit diagram of the single-chip financial audio IC of the application in FIG. 1. The financial single-chip audio IC card comprises a security chip (which can be directly purchased in the market), contact module, non-contact module and audio module. The security chip is used for controlling, analyzing and processing data according to the related specifications of China Financial Integrated Circuit (IC) card and 14443 specification of ISO; the contact module has function of contact communication, including 7816 interface; the non-contact module has function of non-contact communication; the audio module has function of acoustic communication, including switch, battery and buzzer; the contact module, non-contact module and audio module are connected in parallel to the switch of security chip.

In this embodiment, the security chip conforms to PBOC 2.0 and above specifications, the related specifications of China Financial Integrated Circuit (IC) card and 14443 specification of ISO. The audio module shares the same security chip with contact module and non-contact module, so that it can guarantee the security of the audio module and reduce the failure rate and the production cost, therefore, the single-chip financial audio IC card will have the advantages of high security, low cost, good stability and high reliability, and there is no need to change the existing card writing process and modify the existing card writer device. Since only one security chip is used, the overall circuit of the single-chip financial audio IC card is simplified, thus it would be more flexible for the circuit design and reduce the processing difficulty.

The security chip comprises contact interface, non-contact interface and audio interface. The contact interface has 5 pins defined for 7816, namely VCC, GND, CLK, RST and IO; the non-contact interface comprises 2 pins: LA pin and LB pin as required by the non-contact financial IC card; the audio interface comprises VCC, GND and two or more GPIO pins, where the pin VCC and pin GND of the audio interface are shared with the contact interface, the number of the pins must be two or more, and at least one is set as input pin, one is set as output pin The contact module has function of contact communication, including a 7816 interface which is electrically connected to VCC, GND, CLK, RST and IO pins of the contact interface of the security chip. When it requires the contact communication mode of the single-chip financial IC card, the information exchange with the payment terminal (not shown) can be realized by the pins of the contact interface. At the same time, the programming of the audio module and the non-contact module can be written through 7816 or RF antenna. The burning device and process are already standardized, which is not necessary to be altered.

The non-contact module has function of non-contact communication, including radio frequency coil. When it requires the non-contact communication mode of the single-chip financial IC card, the information exchange with the payment terminal can be realized by the LA and LB pins of the contact interface.

The audio module has function of acoustic communication, including a switch, a buzzer and a battery. The switch has three pins identified as the first pin 1, the second pin 2 and the third pin 3. When the switch is turned off, the three pins of the switch are disconnected with each other. The first pin 1 is connected to the negative pole or the positive pole of the battery, the second pin 2 is correspondingly connected to the GND or the VCC of the security chip, and the third pin 3 is electrically connected to the GPIO pin of the security chip. The buzzer has two pins, which are electrically connected to the two pins of the security chip respectively. The battery has two pins, the pin of positive pole is electrically connected to the VCC of the security chip and the pin of negative pole is electrically connected to the first pin 1 of the switch. When the audio communication mode of the single-chip financial IC card is required, the first pin 1, the second pin 2, and the third pin 3 are turned on, and the battery begins to supply power to the security chip. At the same time, the electrical level of GPIO1 changes, after which is detected by the security chip, the security chip goes into the audio communication mode, triggering the GPIO2 to send sound actuating signal to the buzzer, which will send out sound actuating signal and realize the acoustic communication when it receives the sound signal from the security chip.

In this embodiment, the positive pole of the battery is electrically connected to the VCC pin of the security chip, and the negative pole of the battery is electrically connected to the first pin 1 of the switch. The first pin 1 of the switch is electrically connected to the negative pole of battery, the second pin 2 is electrically connected to the GND pin of the security chip and the third pin 3 is electrically connected to the GPIO1 of the security chip. The buzzer has two pins, the A pin is electrically connected to GPIO1 directly, and B pin is electrically connected to GPIO2 directly, and the connection of the switch and the battery is the same as that of the first embodiment. In this embodiment, it needs two GPIO pins, thus making the most of the GPIO pin resources of the security chip.

The working principle of the single-chip financial audio IC card: when the financial IC card is inserted into machines of contact modes such as a card reader, ATM etc., the contact interface of the security chip is turned on and the financial IC card goes into the contact working mode; when the financial IC card is close to machines of non-contact modes such as non-contact card reader, the RF antenna receives electromagnetic signal, generates electrical energy through the electromagnetic signal to drive the security chip to operate, receives and transmits the electromagnetic signal; and then the financial IC card goes into the non-contact working mode. When the switch of the financial IC card is turned on, the battery begins to supply power to the security chip, driving the security chip to work. At the same time, the electrical level of the GPIO1 pin is changed. While the security chip detects the change of the GPIO1 pin, it will go into the audio operation mode. At the same time, the acoustic actuating signal is transmitted to the buzzer through the GPIO2 pin. The buzzer transmits sound waves when it receives the acoustic drive signal from the security chip.

Embodiment 2

Figure 3:
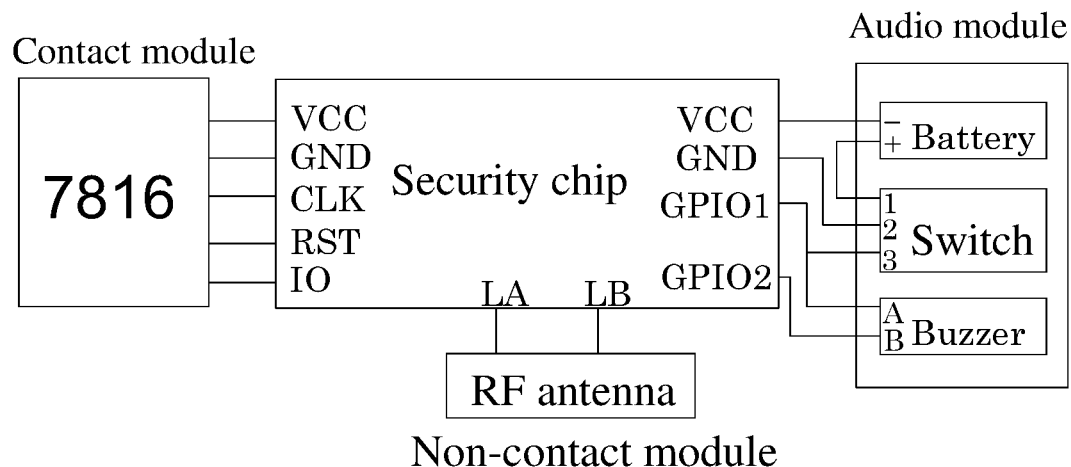
FIG. 3 is a circuit schematic diagram of embodiment 2 of the single-chip financial audio IC card of the application.

Referring to FIG. 1 and FIG. 3, FIG. 3 is a circuit diagram of embodiment 2 of the single-chip financial audio IC card of the application. Embodiment 2 differs from embodiment 1 in that the positive and negative poles of the battery in the single-chip financial audio IC card are exchanged, in which, the negative pole of the battery is electrically connected to the GND of the security chip directly, the positive pole of the battery is electrically connected to the VCC of the security chip directly, and the connection of remaining components can be consistent with that of embodiment 1 or embodiment 2.

Embodiment 3

Figure 4:
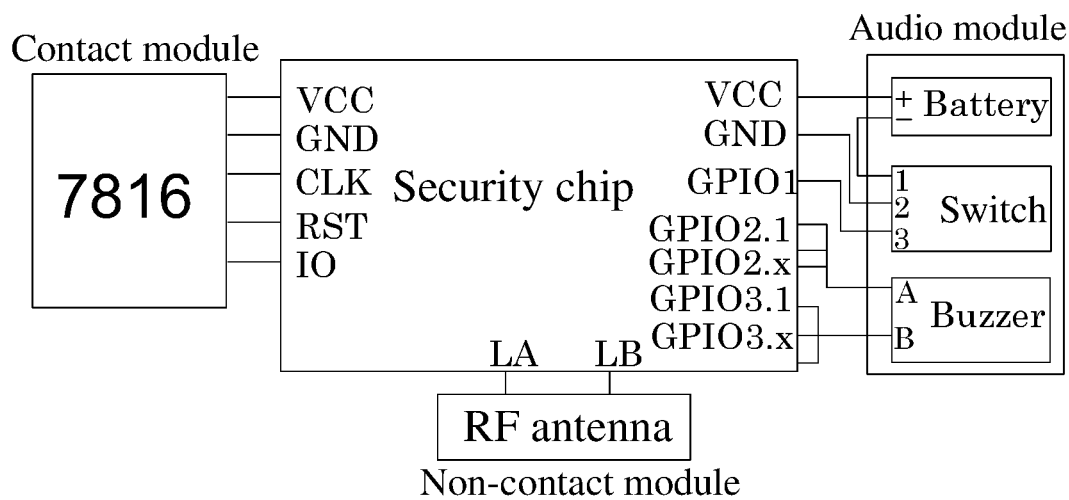
FIG. 4 is a circuit schematic diagram of embodiment 3 of the single-chip financial audio IC card of the application.

Referring to FIG. 1 and FIG. 4, FIG. 4 is a circuit diagram of embodiment 3 of the single-chip financial audio IC card of the application. Embodiment 3 differs from embodiment 1 and embodiment 2 in that it has two pins in the buzzer of the single-chip financial audio IC card, namely the A pin and B pin. When there are enough GPIO pins of the security chip, each pin can be connected to any numbers of GPIO pins. In the figure, x in the phrase of "GPIO2.x" and "GPIO3.x" means plural, and x is an integer greater than or equal to one.

Embodiment 4

Figure 5:
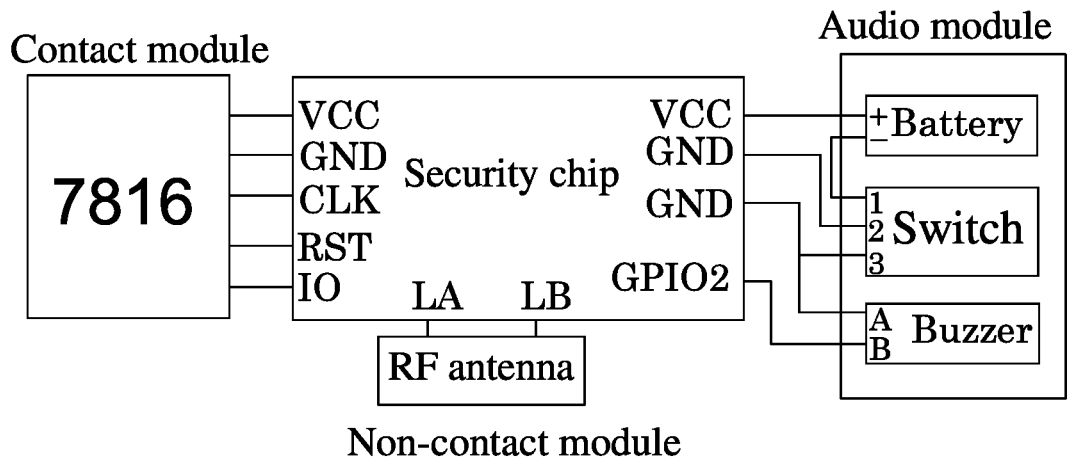
FIG. 5 is a circuit schematic diagram of embodiment 4 of the single-chip financial audio IC card of the application.

Referring to FIG. 1 and FIG. 5, FIG. 5 is a circuit diagram of embodiment 5 of the single-chip financial audio IC card of the present application. What Embodiment 4 differs from embodiment 1, embodiment 2 and embodiment 3 is that it has two pins in the buzzer of the single-chip financial audio IC card, namely A pin and B pin. A pin is electrically connected to GND directly, and B pin is electrically connected to GPIO2 directly. In this embodiment, each of the two pins of buzzer can be electrically connected to the GND pin or VCC pin of the security chip directly, that is to say, the GND pin, which A pin of the buzzer is connected with, can be replaced with the VCC pin in the FIG. 5.

Embodiment 5

Figure 6:
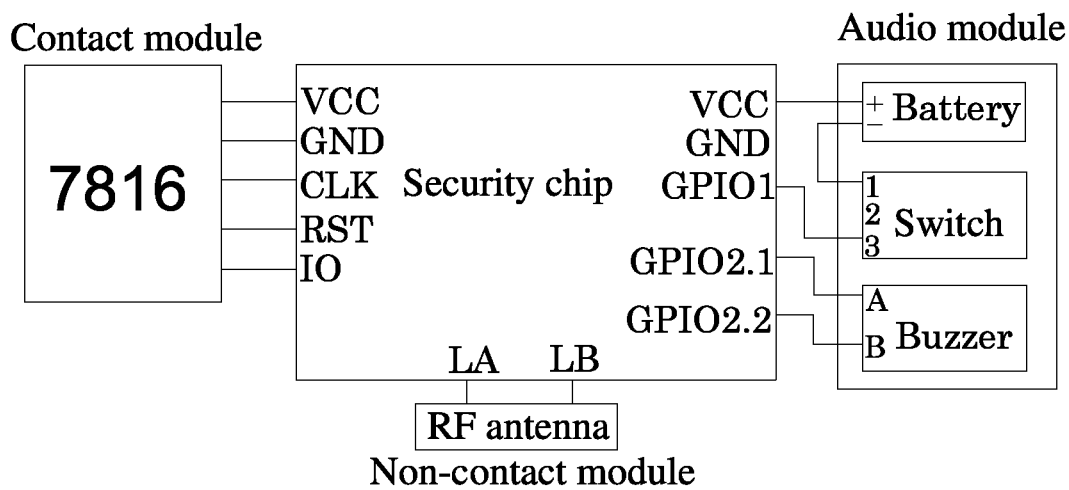
FIG. 6 is a circuit schematic diagram of embodiment 5 of the single-chip financial audio IC card of the application.

Referring to FIG. 1 and FIG. 6, FIG. 6 is a circuit diagram of embodiment 5 of the single-chip financial audio IC card of the present application. What Embodiment 5 differs from embodiment 1, embodiment 2, embodiment 3 and embodiment 4 is that the first pin of the switch of the single-chip financial audio IC card connects to one pole of the battery, the second pin thereof does not connect to any devices, the third pin thereof connects to the GPIO1 pin; In this way, the three-pin switch is functionally a two-pin switch, the GPIO1 pin provides the audio module with start signal and the security chip with supply channel.

Compared with related technology, the single-chip financial audio IC card of the application reduces the cost and processing difficulty by connecting the contact module, the non-contact module and the audio module in parallel to the security chip and sharing the same security chip. It is compatible to the existing chip burning process, so there is no need to change the existing burning equipment and process, thus causing no cost in equipment transformation, which also increases the security, stability and reliability. At the same time, it could change the audio module into its working or non-working state through the switch, avoiding the single-chip financial IC card working in the audio communication mode and contact/non-contact communication mode at the same time, so it does not affect the user experience.

The patent scope of the application is not limited to the above-described embodiments, and any equivalent structure or equivalent process transformation by using the contents and drawings of the application or the technical solution directly or indirectly used in related technical field are within the scope of the application.

What is claimed is:

1. A single-chip financial audio IC card, comprising:
a security chip used for controlling, analyzing and processing data, a contact module having a function of contact communication,
a non-contact module having a function of non-contact communication, and an audio module having a function of acoustic communication;
the contact module comprises a 7816 interface;
the non-contact module comprises a radio frequency (RF) coil;
the audio module comprises a switch, a buzzer and a battery; and
the contact module, the non-contact module and the audio module are connected in parallel to the security chip;
wherein the security chip comprises a contact interface, a non-contact interface and an audio interface;
the contact interface comprises VCC, GND, CLK, RST and IO pins;
the non-contact interface comprises LA pin and LB pins, the LA pin and the LB pin being respectively connected to both ends of the RF coil;
the VCC and GND pins are shared by the audio interface; and the audio interface further comprises two or more GPIO pins.

2. The single-chip financial audio IC card according to claim 1, wherein, a positive pole of the battery in the audio module is directly connected to the security chip, and a negative pole of the battery is directly connected to the switch; the switch comprises a first pin, a second pin and a third pin; wherein the first pin is connected to the negative pole of the battery; the second pin is connected to the GND pin of the security chip; the third pin is connected to one of the GPIO pins in the security chip set as GPIO1; the first, second and third pins of the switch are disconnected with each other before the switch is turned on, and connected with each other after the switch is turned on; and the buzzer comprises a A pin and a B pin, the A pin of the buzzer is connected to at least one of other GPIO pins except the GPIO1 pin of the security chip set as GPIO2, and the B pin of the buzzer is connected to other GPIO pins except the GPIO2 pin.

3. The single-chip financial audio IC card according to claim 2, wherein, the switch is in series with the battery and the security chip for controlling the power supply of the battery to the security chip; and the switch is connected to the GPIO1 of the security chip, so as to provide the audio module with an actuating signal and the security chip with a power supply channel.

4. The single-chip financial audio IC card according to claim 3, wherein, the A pin of the buzzer is directly connectable to the VCC pin, the GND pin, the GPIO1 pin or the other GPIO pins except the GPIO1 pin; and the B pin of the buzzer is directly connectable to any one or more GPIO pins except the GPIO1 pin of the security chip.

5. The single-chip financial audio IC card according to claim 3, wherein, the security chip comprises at least two additional GPIO pins which are configurable as input interfaces or output interfaces according to practical demands, and at least one of the at least two additional GPIO pins is set as an input pin and another of the at least two additional GPIO pins is set as an output pin.

6. The single-chip financial audio IC card according to claim 3, wherein, the GPIO1 pin is configurable as a power supply channel for the security chip, and the second pin of the switch is configurable to be disconnected to any of the GND or VCC pins of the security chip when the GPIO1 pin is configured as the power supply channel for the security chip.

7. The single-chip financial audio IC card according to claim 1, wherein, one pole of the battery in the audio module is directly connected to the security chip, and another pole of the battery is directly connected to the switch; the switch comprises a first pin, a second pin and a third pin; the first pin is connected to the one pole or the other pole of the battery; the second pin is connected to the GND pin of the security chip; the third pin is connected to one of the GPIO pins in the security chip set as GPIO1; and the buzzer comprises a A pin and a B pin, and the A pin and the B pin of the buzzer are connected to two of the two or more GPIO pins of the security chip respectively, one of which is the GPIO1 pin, the other of which is a GPIO2 pin.

8. The single-chip financial audio IC card according to claim 1, wherein, the 7816 interface comprises VCC, GND, CLK, RST and IO pins, and the VCC, GND, CLK, RST and IO pins of the 7816 interface are connected to a corresponding pin of the security chip respectively.

9. The single-chip financial audio IC card according to claim 1, wherein, the non-contact module comprises a RF antenna, and the RF antenna is directly connected to the LA pin and the LB pin of the security chip.

10. The single-chip financial audio IC card according to claim 1, wherein, the security chip comprises VCC and GND pins shared by the contact module and the audio module; the 7816 interface of the contact module is directly connected to the VCC and GND pins; a positive pole or a negative pole of the battery in the audio module is respectively and correspondingly connected to the VCC pin or the GND pin of the security chip directly, accordingly, the switch is correspondingly connected in series with the positive pole or the negative pole of the battery, and with the GND pin or the VCC pin of the security chip.

\* \* \* \* \*